US012805419B2

(12) United States Patent
Eckstein et al.

(10) Patent No.: US 12,805,419 B2
(45) Date of Patent: Nov. 24, 2026

(54) COUPLING ARRANGEMENT FOR AN AGRICULTURAL TRACTOR

(71) Applicant: DEERE & COMPANY, Moline, IL (US)

(72) Inventors: Christian Eckstein, Heppenheim (DE); Mario Patino, Ludwigshafen am Rhein (DE); Martin Heitlinger, Gevelsberg (DE); Benjamin Spohn, Heiligkreuzsteinach (DE); Abhijit G. Hingne, Pune (IN)

(73) Assignee: Deere & Company, Moline, IL (US)

( * ) Notice: Subject to any disclaimer, the term of this patent is extended or adjusted under 35 U.S.C. 154(b) by 161 days.

(21) Appl. No.: 19/018,610

(22) Filed: Jan. 13, 2025

(65) Prior Publication Data

US 2025/0241220 A1 Jul. 31, 2025

(30) Foreign Application Priority Data

Jan. 26, 2024 (DE) ......................... 102024102279.5

(51) Int. Cl.
*A01B 59/00* (2006.01)
*B60D 1/06* (2006.01)
(Continued)

(52) U.S. Cl.
CPC .............. *A01B 59/004* (2013.01); *B60D 1/06* (2013.01); *B60D 1/155* (2013.01); *B60D 1/44* (2013.01); *B60D 2001/008* (2013.01)

(58) Field of Classification Search
CPC ...... A01B 59/004; B60D 1/155; B60D 1/145; B60D 1/40; B60D 1/44; B60D 1/06; B60D 1/1675; B60D 2001/008
See application file for complete search history.

(56) References Cited

U.S. PATENT DOCUMENTS

| | | | | |
|---|---|---|---|---|
| 2004/0155430 A1* | 8/2004 | Zahn | B60D 1/583 280/490.1 |
| 2010/0133785 A1* | 6/2010 | McCoy | B60D 1/06 280/492 |

(Continued)

FOREIGN PATENT DOCUMENTS

| | | |
|---|---|---|
| DE | 102023104695 A1 | 8/2024 |
| EP | 1216856 B1 | 8/2005 |

(Continued)

OTHER PUBLICATIONS

Extended European Search Report and Written Opinion issued in European Patent Application No. 24216809.4 dated Jun. 13, 2025, in 14 pages.

*Primary Examiner* — Christopher J Sebesta
*Assistant Examiner* — Julia C Tran
(74) *Attorney, Agent, or Firm* — Taft Stettinius & Hollister LLP; Stephen F. Rost

(57) ABSTRACT

A coupling arrangement for an agricultural tractor comprises a drawbar having a first bar section mounted in a longitudinally movable manner along a predefined adjustment region in a holder for attachment to an underside of a power-take-off transmission housing of the agricultural tractor, and a second bar section situated opposite the first bar section and is guided within adjacent upper and lower supporting cheeks of a coupling carrier plate and can be fixed therein in one of a plurality of coupling positions along the predefined adjustment region by a securing element. At least along the predefined adjustment region, the drawbar is configured as an I profile which runs upright within the holder and has upper and lower flanges which are connected by a web. Left and right inner protrusions on the holder are positioned on both sides of the web of the I profile.

8 Claims, 6 Drawing Sheets

(51) Int. Cl.

| | |
|---|---|
| ***B60D 1/155*** | (2006.01) |
| ***B60D 1/44*** | (2006.01) |
| *B60D 1/00* | (2006.01) |

(56) References Cited

U.S. PATENT DOCUMENTS

| | | | | |
|---|---|---|---|---|
| 2013/0253814 | A1* | 9/2013 | Wirthlin | B60D 1/62<br>701/1 |
| 2013/0341887 | A1* | 12/2013 | Wolfe | B60D 1/44<br>280/490.1 |
| 2015/0137484 | A1* | 5/2015 | Columbia | B60D 1/06<br>280/507 |
| 2017/0341477 | A1* | 11/2017 | Reynolds | B60D 1/54 |
| 2023/0226863 | A1* | 7/2023 | West | B60D 1/143<br>280/480 |

FOREIGN PATENT DOCUMENTS

| | | | |
|---|---|---|---|
| EP | 3549797 | A1 | 10/2019 |
| EP | 3821687 | A1 | 5/2021 |

* cited by examiner

COUPLING ARRANGEMENT FOR AN AGRICULTURAL TRACTOR

CROSS-REFERENCE TO RELATED APPLICATIONS

This application claims priority to German Patent Application No. 102024102279.5, filed Jan. 26, 2024, which is hereby incorporated by reference.

TECHNICAL FIELD

The present disclosure relates generally to a coupling arrangement for an agricultural tractor, comprising a drawbar having a first bar section, which is mounted in a longitudinally movable manner along a predefined adjustment region in a holder for attachment to an underside of a power-take-off transmission housing of the agricultural tractor, and a second bar section, which is situated opposite the first bar section and is guided within adjacent upper and lower supporting cheeks of a coupling carrier plate and can be fixed therein in one of a plurality of coupling positions along the predefined adjustment region by a securing element.

BACKGROUND

A coupling arrangement of this kind is known, for example, on agricultural tractors from the manufacturer John Deere. This comprises a drawbar having a first bar section and a second bar section situated opposite the first bar section. The first bar section is mounted in a holder on the underside of a differential housing of the agricultural tractor and is fastened therein by a removable pin, which extends through a bore formed in the first bar section and is screwed to the differential housing. Furthermore, in the region of an end plate carrying a coupling ball, the second bar section has left and right threaded holes for receiving associated hexagonal bolts, by which the end plate is screwed to a coupling carrier plate provided in the rear region of the agricultural tractor. The drawbar can be mounted in one of two different coupling positions by releasing the pin and the two hexagonal bolts, thus enabling various operating situations of an attachment attached to the coupling ball to be taken into account.

Owing to the design, the vertical forces occurring at the drawbar during operation of the attachment act directly on the screw connection produced by the two hexagonal bolts, and therefore correspondingly high tightening torques are required here. These have the effect that transfer of the drawbar between the two coupling positions is possible only with a correspondingly high level of effort and is usually reserved for a workshop visit.

In order to facilitate handling when moving the drawbar, DE 10 2023 104 695 A1 therefore proposes guiding the second bar section in a longitudinally movable manner within adjacent upper and lower supporting cheeks of a coupling carrier plate provided for rear attachment to the agricultural tractor. The drawbar can be moved in this case into a plurality of coupling positions by longitudinal movement and can be locked therein with respect to the coupling carrier plate by at least one securing element. The guidance of the drawbar in the region of the second bar section by the two supporting cheeks or upper and lower sliding surfaces formed thereon ensures that the vertical forces occurring at the drawbar during operation of the attachment can be introduced directly into the coupling carrier plate. As a result, these are no longer associated with the actuating forces to be applied to the at least one securing element in order to lock the drawbar, and therefore these actuating forces can be predefined as desired with regard to convenient handling of the drawbar when changing between its various coupling positions by appropriate selection or design of the at least one securing element.

SUMMARY

Taking this as a starting point, it is an object of the present disclosure to further optimize a coupling arrangement of the type mentioned at the beginning in respect to its handling.

This object is achieved by a coupling arrangement having the features of one or more embodiments disclosed herein.

The coupling arrangement for an agricultural tractor comprises a drawbar having a first bar section, which is mounted in a longitudinally movable manner along a predefined adjustment region in a holder for attachment to an underside of a power-take-off transmission housing of the agricultural tractor, and a second bar section, which is situated opposite the first bar section and is guided within adjacent upper and lower supporting cheeks of a coupling carrier plate and can be fixed therein in one of a plurality of coupling positions along the predefined adjustment region by a securing element. According to the disclosure, it is provided that, at least along the predefined adjustment region, the drawbar is designed as an I profile which runs upright within the holder and has upper and lower flanges which are connected by a web, wherein left and right cheeks or inner protrusions on the holder are positioned or end on both sides of the web of the I profile in such a manner that a lateral guidance of the drawbar within the holder is formed.

The use of an I profile in comparison to solid cross-sectional shapes, such as a rectangular profile including solid material, not only leads to increased rigidity, but also to a corresponding weight reduction of the drawbar, which reduces the material costs and further facilitates its handling.

By the securing element, the drawbar can be locked horizontally both in the longitudinal and transverse direction within the coupling carrier plate with respect to the installation position on the agricultural tractor. The drawbar is vertically supported by the upper and lower supporting cheeks of the coupling carrier plate adjacent to the second bar section. During use on the agricultural tractor, tractive force components which are primarily directed laterally occur in the region of the holder, which tractive force components are introduced into the holder and from there into the power-take-off transmission housing because of the lateral guidance of the drawbar realized by the cheeks or internal protrusions.

Advantageous developments of the coupling arrangement according to the disclosure can be found in one or more embodiments disclosed herein.

The adjustment region is continued as far as the open end of the first bar section, and therefore the drawbar can be pulled completely out of the holder. This allows the drawbar to be completely removed from the coupling arrangement without removal of the holder in the event of the drawbar not being in use or in the event of maintenance-related exchange.

In order to ensure that the vertical forces occurring on the drawbar due to operation are introduced as uniformly as possible into the supporting structures of the agricultural tractor adjacent to the holder or coupling carrier plate, there is the further possibility that, in order to form a sliding guide along the predefined adjustment region, a flat running surface is provided on an outer side of the upper and/or lower flange for contact with an underside of the power-take-off transmission housing or a flat countersurface on the holder.

The at least one securing element is, for example, a threadless securing bolt, which is passed through mutually aligned positioning openings, which are formed in the coupling carrier plate and the second bar section, in order to lock the drawbar, and are secured therein by a split pin or the like.

In particular, a circumferential collar is formed on the securing bolt, which is typically provided with a handle, and, in the mounted state, is supported on an upper side of the coupling carrier plate and fixed thereon by a rotation lock, and therefore the maintaining of a defined operating position of the handle is ensured. The rotation lock may be formed, for example, by a flattened portion which is provided on the circumferential upper collar and on which a stop provided on the upper side of the coupling carrier plate engages.

It can also be provided that left and right runners for reception in a rail system carrier of a tractor coupling system are formed on the coupling carrier plate. The rail system carrier is typically in the form of a trailer bracket mounted on a differential housing in the rear region of the agricultural tractor. The trailer bracket comprises left and right fixing rails, into which the runners of the coupling carrier plate are inserted and screwed by a plurality of threaded bolts.

A coupling element, equipped with a ball head for example, can be attached to the second bar section. This is usually what is referred to as a K80 ball head, which is used to attach a complementary ball socket of an attachment coupling. In this case, the ball head can be mounted on the second bar section or on the coupling element so as to be removable for the purposes of maintenance-related or wear-related exchange.

Furthermore, on the second bar section left and right pocket-shaped recesses can be provided, which are designed for the production of a releasable dovetail connection with left and right auxiliary coupling elements for actuating a forced steering system comprised by a steerable attachment. Each of the auxiliary coupling elements carries a K50 ball, into which a steering actuation linkage of the forced steering system can be hooked. In order to secure the dovetail connection, each of the two auxiliary coupling elements is additionally screwed tightly to the second bar section. The steerable attachment may be a transport trailer or a manure tanker, for example.

Other features and aspects will become apparent by consideration of the detailed description, claims, and accompanying drawings.

BRIEF DESCRIPTION OF THE DRAWINGS

The coupling arrangement according to the disclosure for an agricultural tractor will be described in more detail below with reference to the drawings. Here, identical reference signs relate to corresponding components, or components which are of comparable function. In the drawings.

Like reference numerals are used to indicate like elements throughout the several figures.

DETAILED DESCRIPTION

Figure 1:
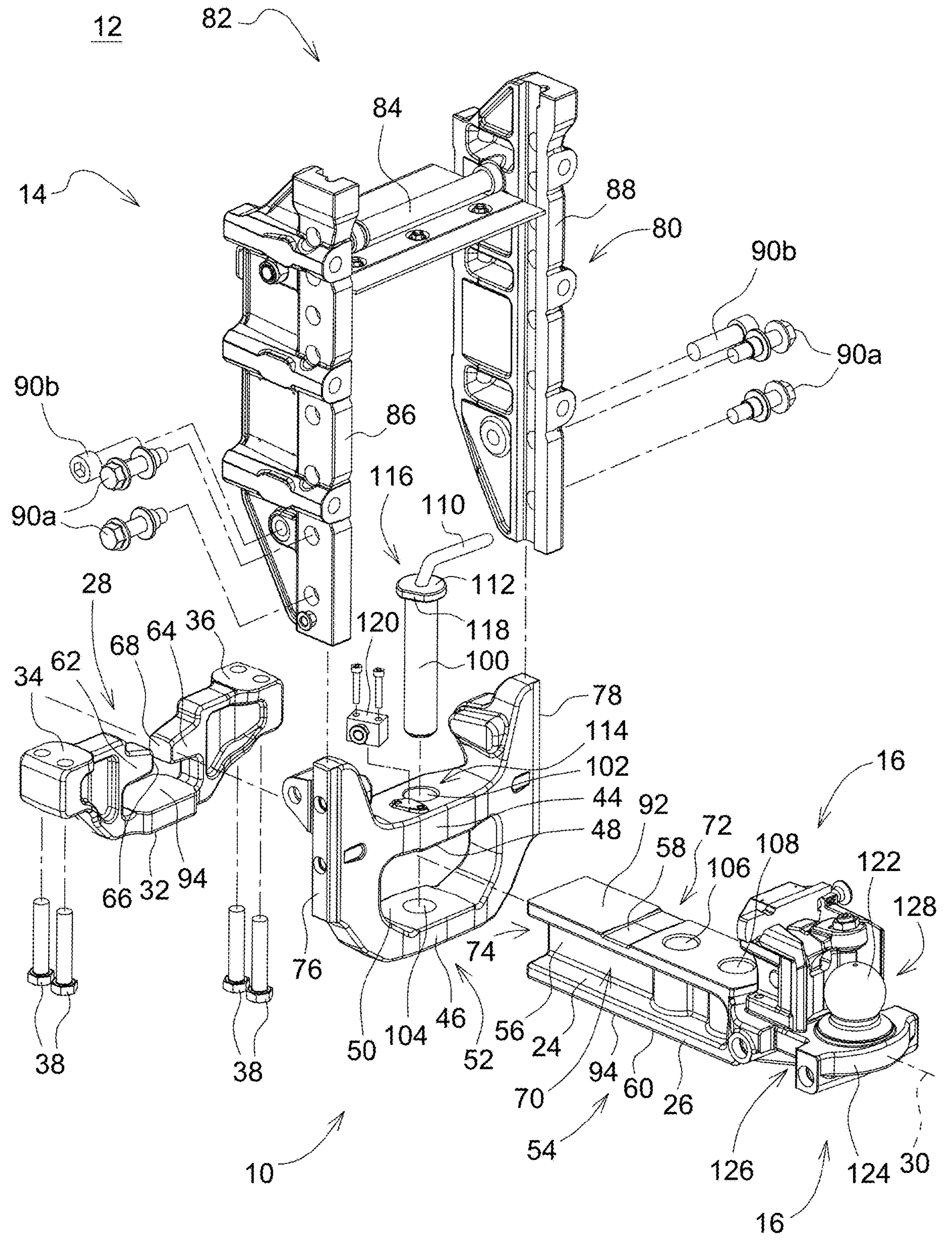
FIG. 1 shows a perspective exploded illustration of an exemplary embodiment of the coupling arrangement according to the disclosure for an agricultural tractor.
Figure 2:
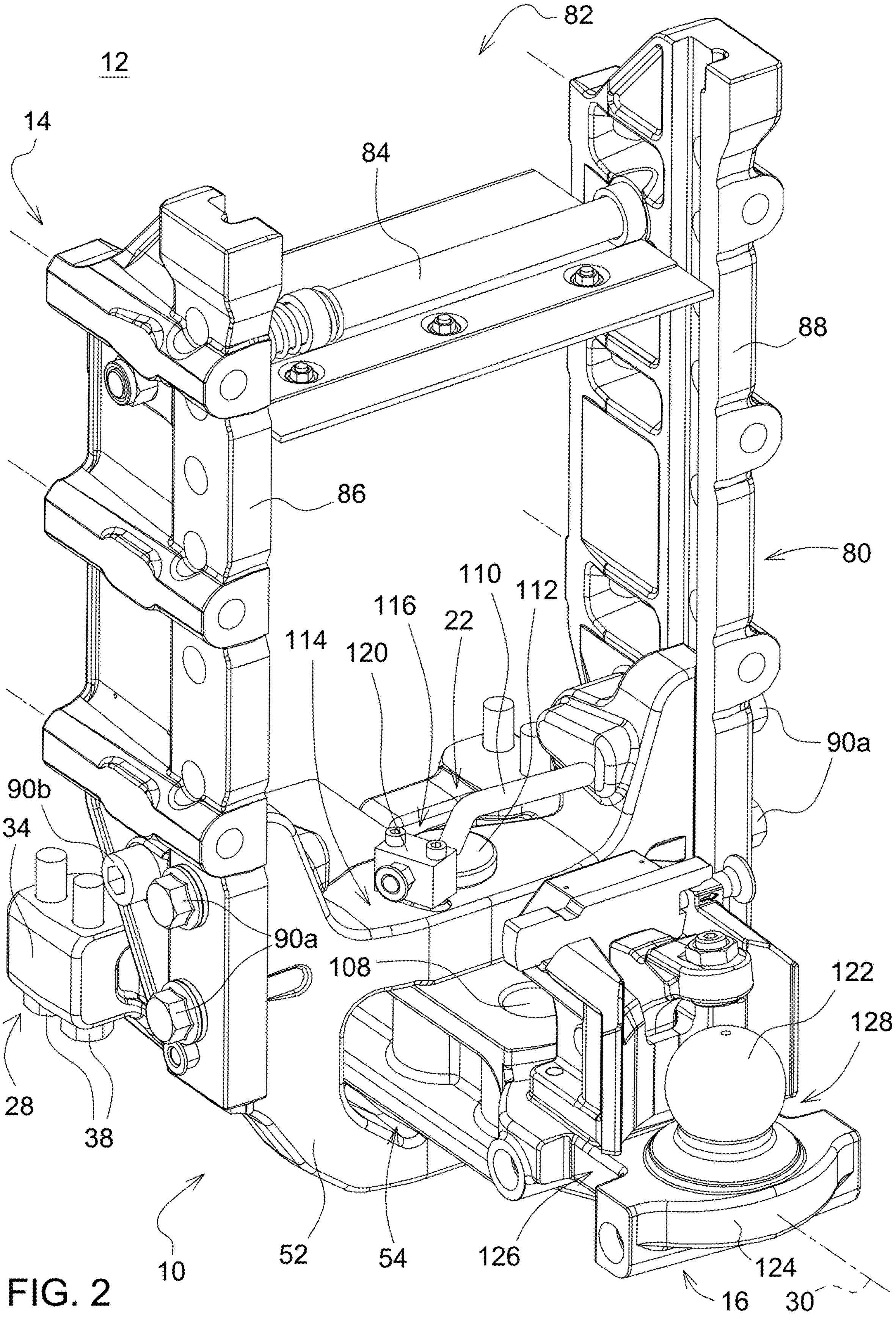
FIG. 2 shows an illustration of the coupling arrangement, which is reproduced in FIG. 1, in an assembled state.

FIGS. 1 and 2 show various perspectively illustrated complete views of an exemplary embodiment of the coupling arrangement 10 according to the disclosure for a (merely graphically indicated) agricultural tractor 12 in an exploded illustration and in an assembled state.

Figure 3:
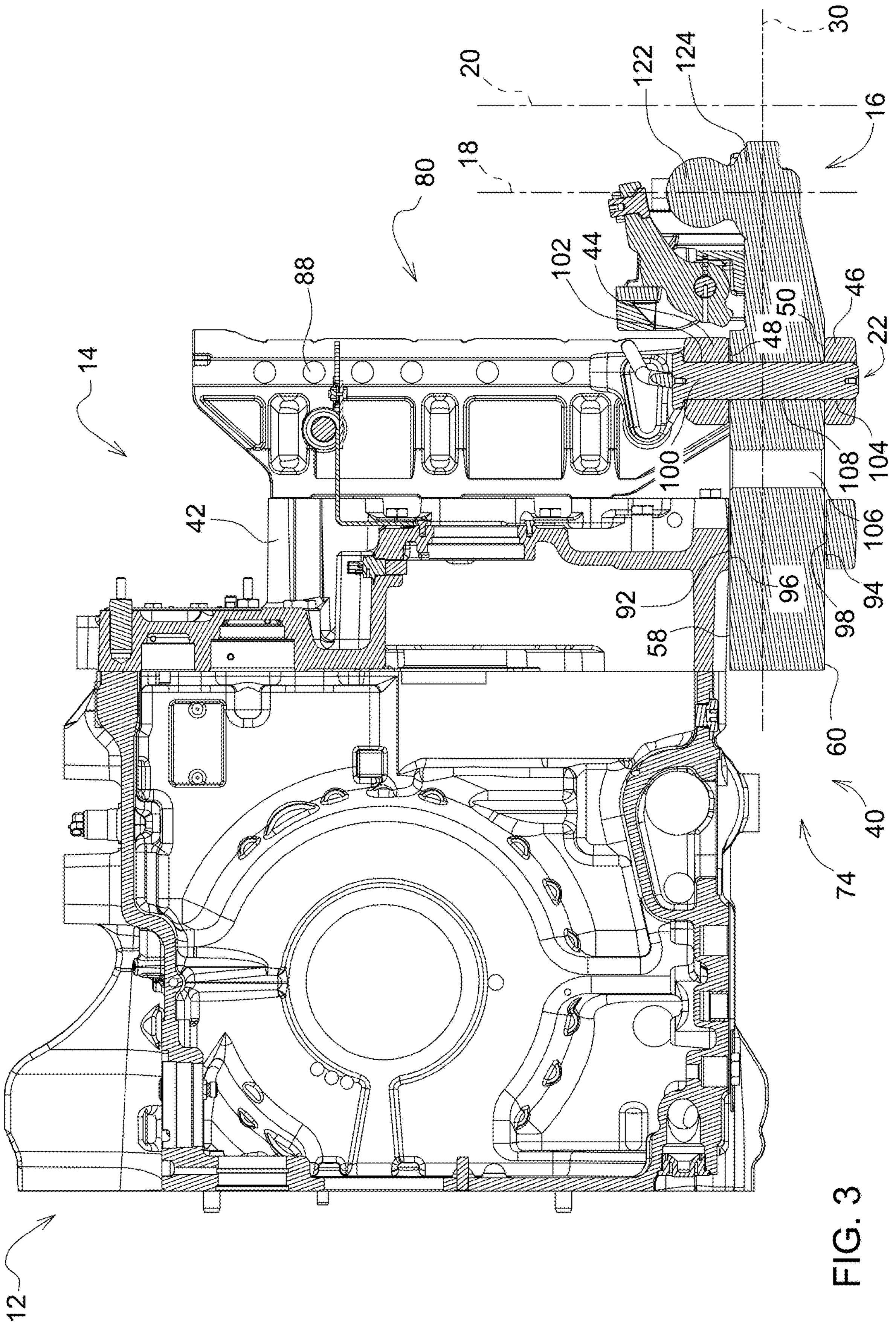
FIG. 3 shows a side view, which is reproduced in section, of the coupling arrangement, which is shown in FIG. 2, on a power-take-off transmission housing of the agricultural tractor in a first coupling position.
Figure 4:
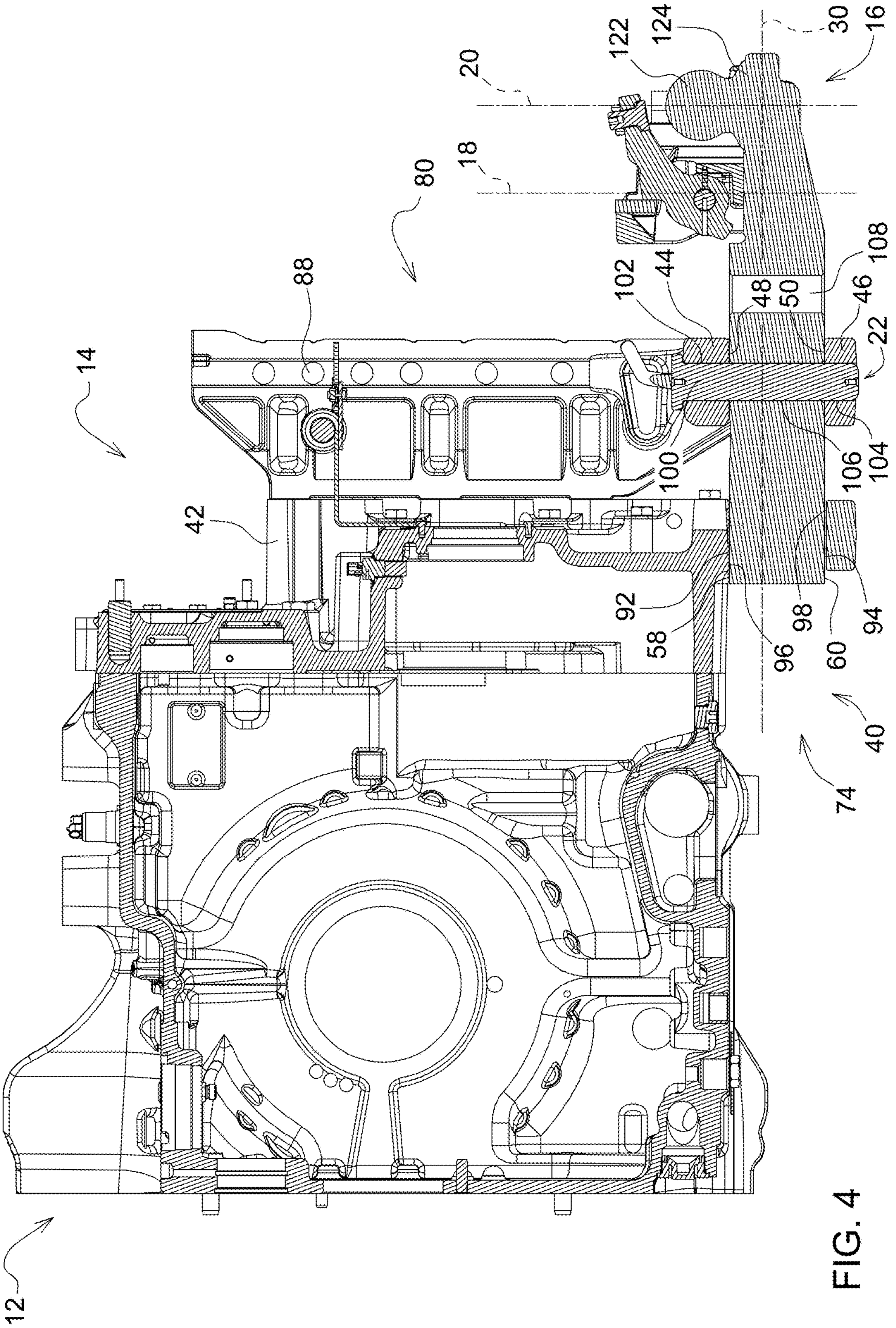
FIG. 4 shows a side view, which is reproduced in section, of the coupling arrangement, which is shown in FIG. 2, on a power-take-off transmission housing of the agricultural tractor in a second coupling position.

The coupling arrangement 10, which is situated in the rear region 14 of the agricultural tractor 12, comprises a drawbar 16 which can be moved lengthwise into various coupling positions 18, 20 and locked therein by a securing element 22 (see in this respect FIGS. 3 and 4).

Furthermore, the drawbar 16, which is produced as a steel forging, has a first bar section 24 and a second bar section 26, which is situated opposite the first bar section 24. The first bar section 24 is mounted in a longitudinally movable manner along a predefined or permissible adjustment region ΔL in a holder 28.

As can be seen in FIG. 1 in conjunction with FIGS. 3 and 4, the holder 28 comprises a supporting plate 32, which runs transversely to the longitudinal extent 30 of the drawbar 16, extends in the form of a bridge between two mounting sections 34, 36 and is screwed by a plurality of threaded bolts 38 on an underside 40 of a power-take-off transmission housing 42 of the agricultural tractor 12. The second bar section 26 is guided in a manner substantially free from play within adjacent upper and lower supporting cheeks 44, 46 or upper and lower sliding surfaces 48, 50 of a coupling carrier plate 52 that are formed thereon.

At least along the predefined or permissible adjustment region ΔL, the drawbar 16 is designed as an I profile 54 which runs upright within the holder 28 and has upper and lower flanges 58, 60 connected by a web 56. Left and right cheeks or inner protrusions 62, 64 on the holder 28 are positioned on both sides of the web 56 of the I profile 54 in such a way that a lateral guidance of the drawbar 16 within the holder 28 is formed. To this end, the cheeks or inner protrusions 62, 64, which are integrally formed on the mounting sections 34, 36 of the holder 28, in the region of sliding surfaces 66, 68 formed thereon end at as little distance as possible from a running surface 70, 72 provided on a respectively adjacent outer side of the web 56.

In the present case, the adjustment region ΔL is continued as far as the open end 74 of the first bar section 24, and therefore the drawbar 16 can be pulled completely out of the holder 28. This allows the drawbar 16 to be completely removed from the coupling arrangement 10 without removal of the holder 28 in the event of the drawbar not being in use or in the event of maintenance-related exchange.

Furthermore, left and right runners 76, 78 for reception in a rail system carrier 80 of a tractor coupling system 82 are formed on the coupling carrier plate 52. The rail system carrier 80 is in the form of a trailer bracket 84 mounted on the power-take-off transmission housing 42 in the rear region 14 of the agricultural tractor 12 (cf. FIGS. 3 and 4). The trailer bracket 84 comprises left and right fixing rails 86, 88, into which the runners 76, 78 of the coupling carrier plate 52 are inserted and screwed by a plurality of threaded bolts 90*a*, 90*b*.

As can be seen from the sectional illustrations of the coupling arrangement 10 in FIG. 3 or 4, the drawbar 16 can be moved into one of the coupling positions 18, 20 by longitudinal movement and can be locked therein with respect to the coupling carrier plate 52 by the securing element 22. According to the example, two coupling positions 18, 20 are provided, but there can also be any other number with a possibly different fixing hole pattern.

By the securing element 22, the drawbar 16 is locked horizontally both in the longitudinal and transverse direction within the coupling carrier plate 52 with respect to the installation position on the agricultural tractor 12. The drawbar 16 is vertically supported by the upper and lower supporting cheeks 44, 46 of the coupling carrier plate 52 adjacent to the second bar section 26. During use on the agricultural tractor 12, tractive force components which are primarily directed laterally occur in the region of the holder 28, which tractive force components are introduced into the holder 28 and from there into the power-take-off transmission housing 42 because of the lateral guidance of the drawbar 16 realized by the cheeks or internal protrusions 62, 64.

In order to ensure that the vertical forces occurring on the drawbar 16 due to operation are introduced as uniformly as possible into the supporting structures of the agricultural tractor 12 adjacent to the holder 28 or coupling carrier plate 52, it is provided that, in order to form a sliding guide along the predefined or permissible adjustment region ΔL, a flat running surface 92, 94 is provided on an outer side of the upper and/or lower flange 58, 60 for contact with a flat countersurface 96, 98 on the underside 40 of the power-take-off transmission housing 42 or the holder 28.

In the present case, the securing element 22 is a threadless securing bolt 100, which, for locking the drawbar 16, is passed through mutually aligned positioning openings 102, 104, 106, 108 which are formed in the coupling carrier plate 52 and the second bar section 26 and can be secured therein by a split pin (not shown). The positioning openings 102, 104, 106, 108 run substantially perpendicularly to the longitudinal extent 30 of the drawbar 16, wherein a plurality of positioning openings 106, 108 is provided at intervals along the second bar section 26 in accordance with the respective associated coupling position 18, 20 of the drawbar 16.

A circumferential collar 112 is formed on the securing bolt 100, which is provided with a handle 110, and, in the mounted state, is supported on an upper side 114 of the coupling carrier plate 52 and fixed thereon by a rotation lock 116, and therefore the maintaining of a defined operating position of the handle 110 is ensured. The rotation lock 116 is formed, according to the example, by a flattened portion 118 which is provided on the circumferential upper collar 112 and on which a stop 120 provided on the upper side 114 of the coupling carrier plate 52 engages.

Furthermore, a coupling element 124 equipped with a ball head 122 is attached to the second bar section 26 (see, inter alia, FIG. 1). In the present case, this is what is referred to as a K80 ball head, which is used to attach a complementary ball socket (not shown) of an attachment coupling. The ball head 122 is mounted on the second bar section 26 or on the coupling element 124 so as to be removable for the purposes of maintenance-related or wear-related exchange.

Figure 5:
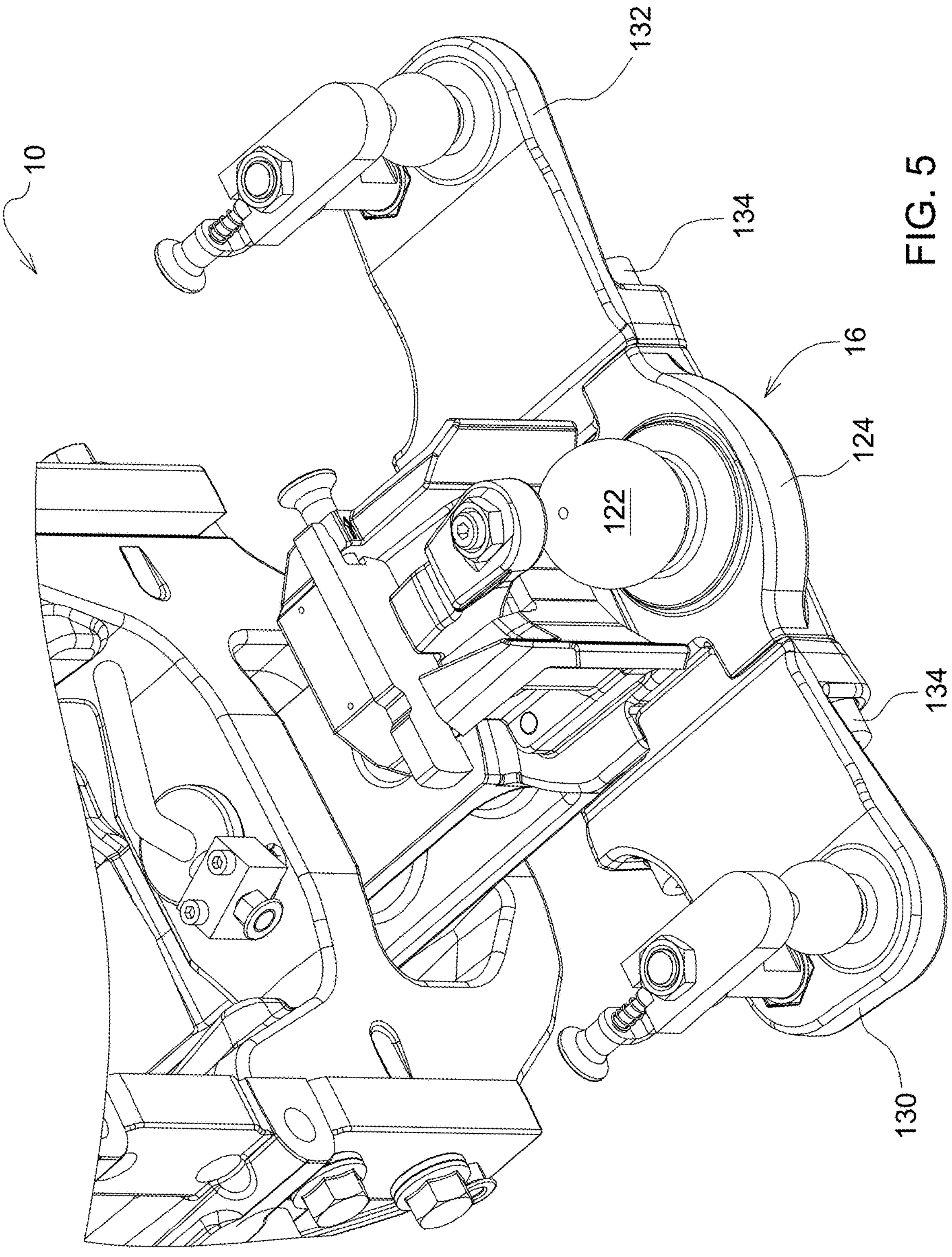
FIG. 5 shows the coupling arrangement, which is shown in FIG. 2, completed with left and right auxiliary coupling elements which are attached thereto and are intended for actuating a forced steering system comprised by a steerable attachment.
Figure 6:
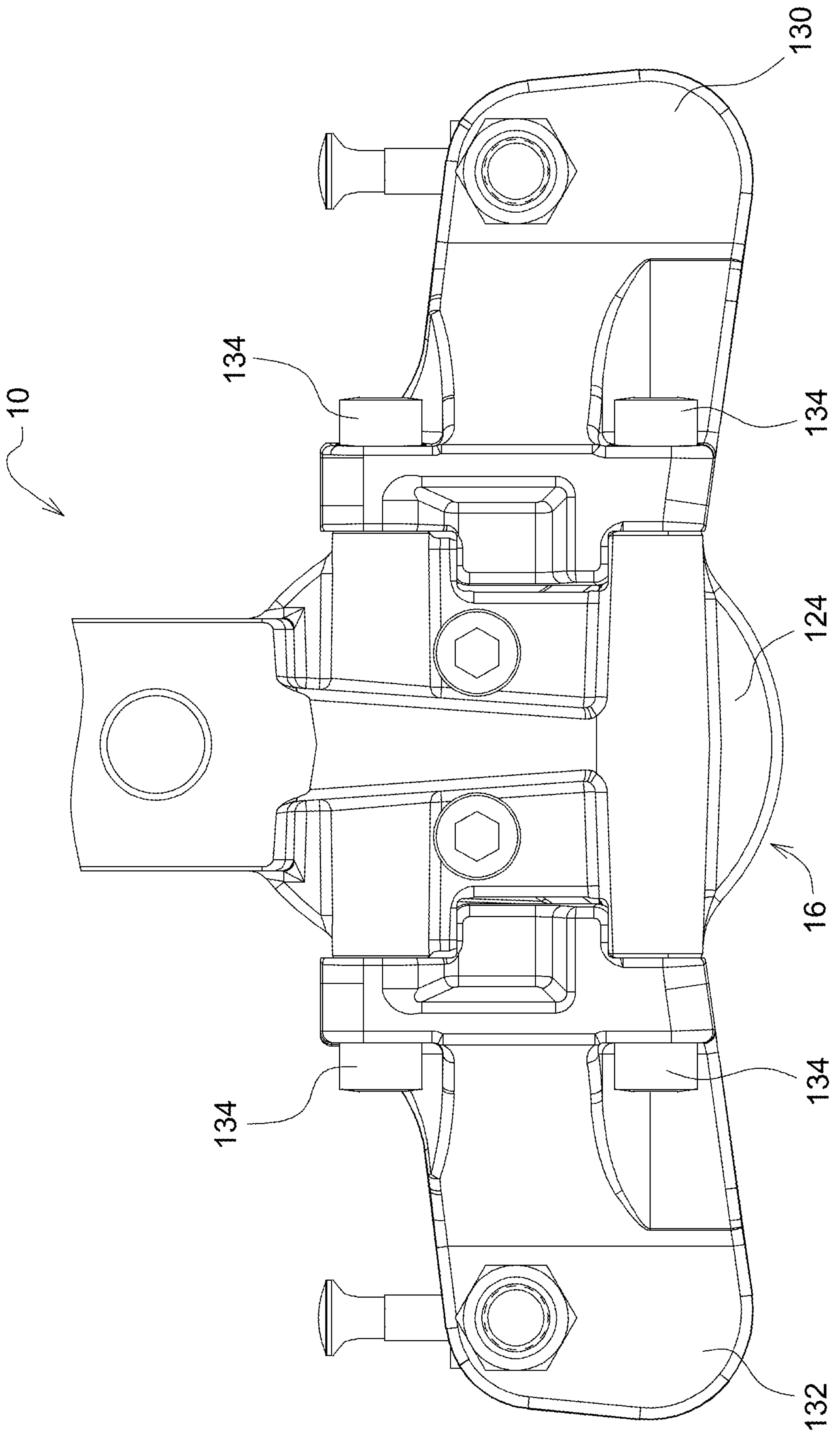
FIG. 6 shows the completed coupling arrangement, which is shown in FIG. 5, as seen from below.

Furthermore, on the second bar section 26 left and right pocket-shaped recesses 126, 128 can be provided, which are designed for the production of a releasable dovetail connection with left and right auxiliary coupling elements 130, 132 for actuating a forced steering system comprised by a steerable attachment (not shown). This completed state is reproduced in FIG. 5. Accordingly, each of the auxiliary coupling elements 130, 132 carries a K50 ball, into which a steering actuation linkage of the forced steering system can be hooked. In order to secure the dovetail connection, each of the two auxiliary coupling elements 130, 132 is additionally screwed tightly to the second bar section 26 by a plurality of threaded bolts 134. The steerable attachment is, for example, a transport trailer or a manure tanker. FIG. 6 shows the coupling arrangement 10 in this respect from below.

For the sake of completeness, it should be noted that the directional details and/or extent details used in the present context refer in each case to the installation position provided for the operation of the coupling arrangement 10 on the agricultural tractor 12.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A coupling arrangement for an agricultural tractor, comprising a drawbar having a first bar section, which is mounted in a longitudinally movable manner along a predefined adjustment region in a holder for attachment to an underside of a power-take-off transmission housing of the agricultural tractor, and a second bar section, which is situated opposite the first bar section and is guided within adjacent upper and lower supporting cheeks of a coupling carrier plate and can be fixed therein in one of a plurality of coupling positions along the predefined adjustment region by a securing element, wherein, at least along the predefined adjustment region, the drawbar is designed as an I profile which runs upright within the holder and has upper and lower flanges which are connected by a web, wherein left and right inner protrusions on the holder are positioned or end on both sides of the web of the I profile such that a lateral guidance of the drawbar within the holder is formed.

2. The coupling arrangement of claim 1, wherein the adjustment region is continued as far as an open end of the first bar section.

3. The coupling arrangement of 1, wherein to form a sliding guide along the predefined adjustment region, a flat running surface is provided on an outer side of the upper or lower flange for contact with the underside of the power-take-off transmission housing or a flat countersurface on the holder.

4. The coupling arrangement of claim 1, wherein the securing element is a threadless securing bolt, which is passed through mutually aligned positioning openings, which are formed in the coupling carrier plate and the second bar section, in order to lock the drawbar.

5. The coupling arrangement of claim 4, wherein a circumferential collar is formed on the securing bolt and, in the mounted state, is supported on an upper side of the coupling carrier plate and fixed thereon by a rotation lock.

6. The coupling arrangement of claim 1, wherein left and right runners for reception in a rail system carrier of a tractor coupling system are formed on the coupling carrier plate.

7. The coupling arrangement of claim 1, wherein a coupling element is attached to the second bar section.

8. The coupling arrangement of claim 1, wherein on the second bar section, left and right pocket-shaped recesses are provided, which are configured for the production of a releasable dovetail connection with left and right auxiliary coupling elements for actuating a forced steering system comprised by a steerable attachment.

* * * * *